Feb. 13, 1962    G. E. PERKINS    3,020,855
CONVEYOR STOP, RELEASE AND ADVANCE MECHANISM
Filed July 29, 1959    5 Sheets-Sheet 1

INVENTOR.
GERALD E. PERKINS
BY *Whittemore Hulbert*
*Belknap*
ATTORNEYS

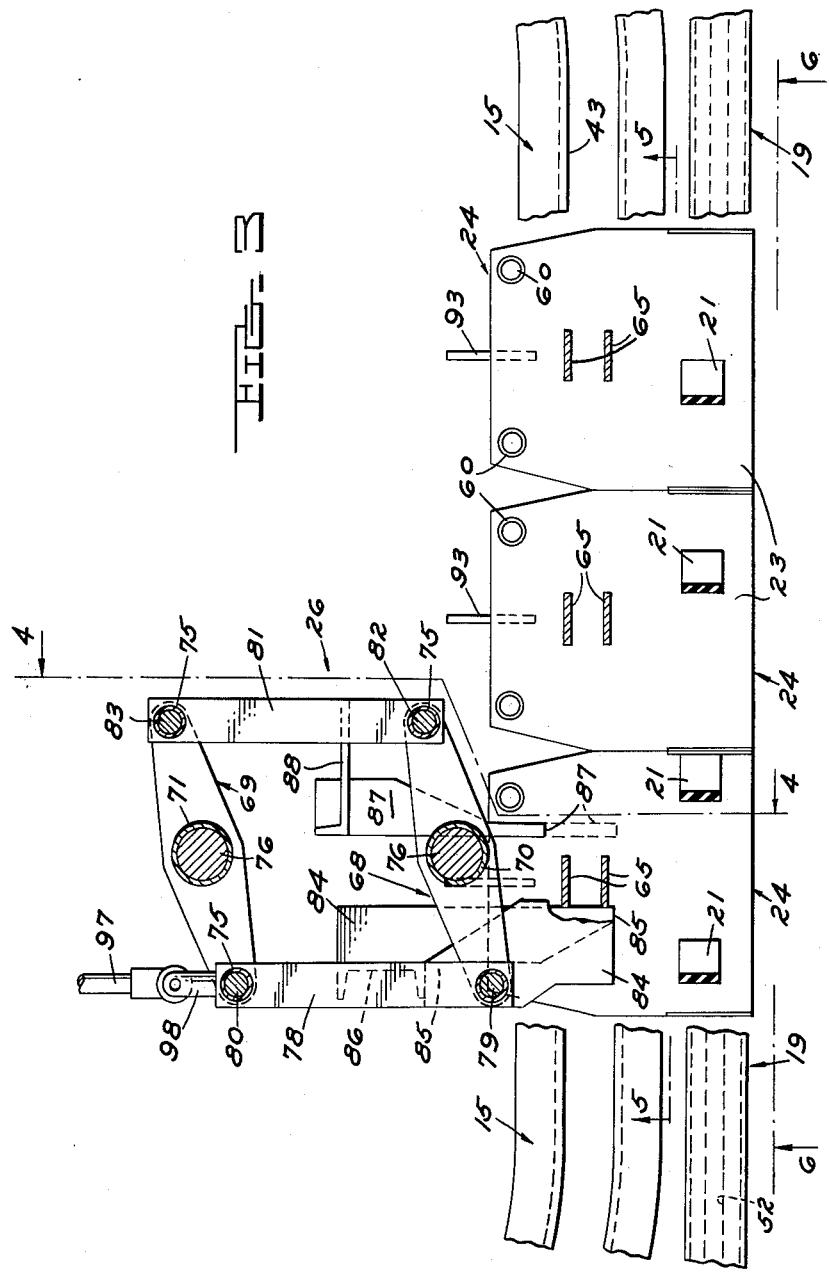

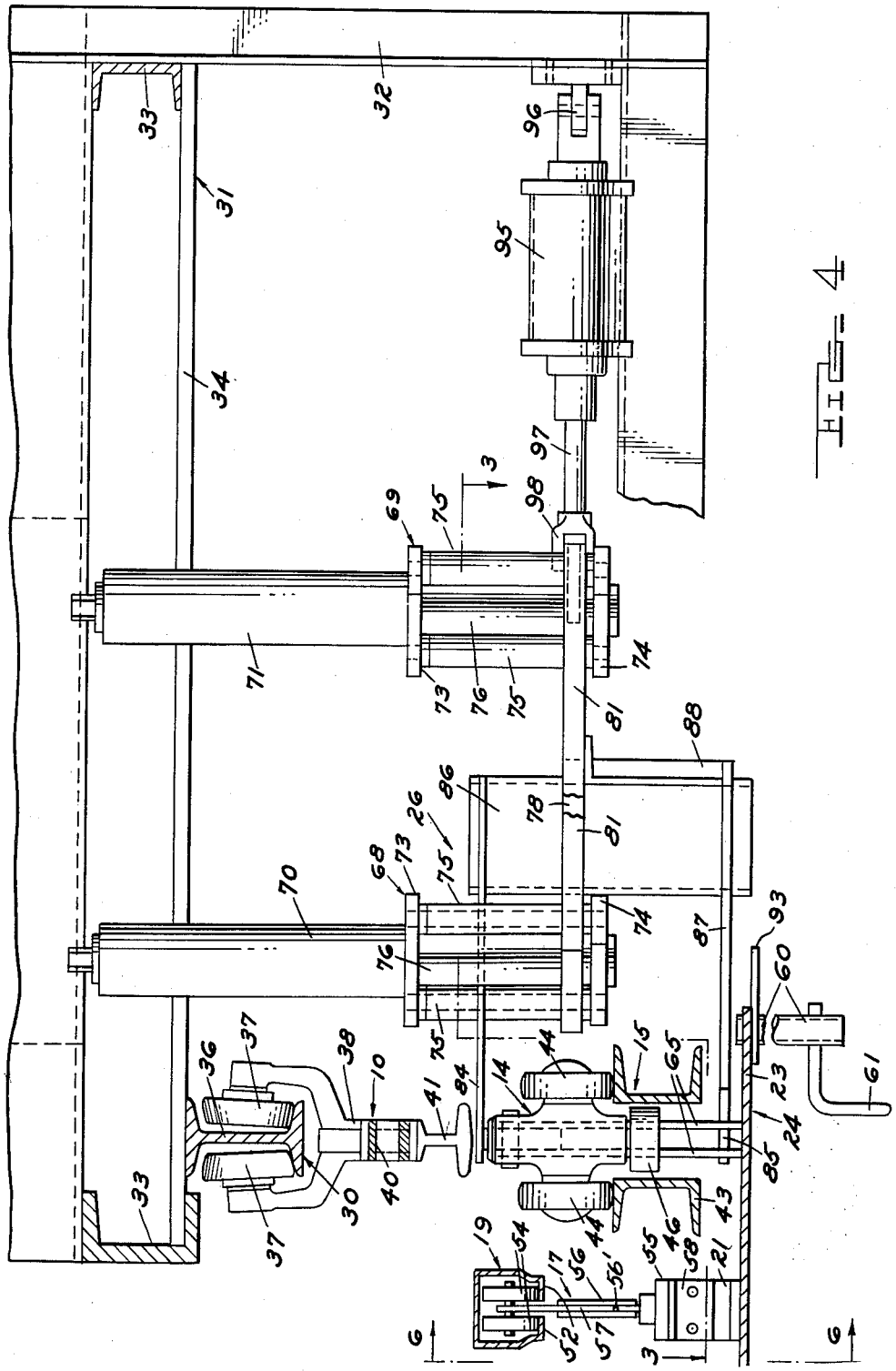

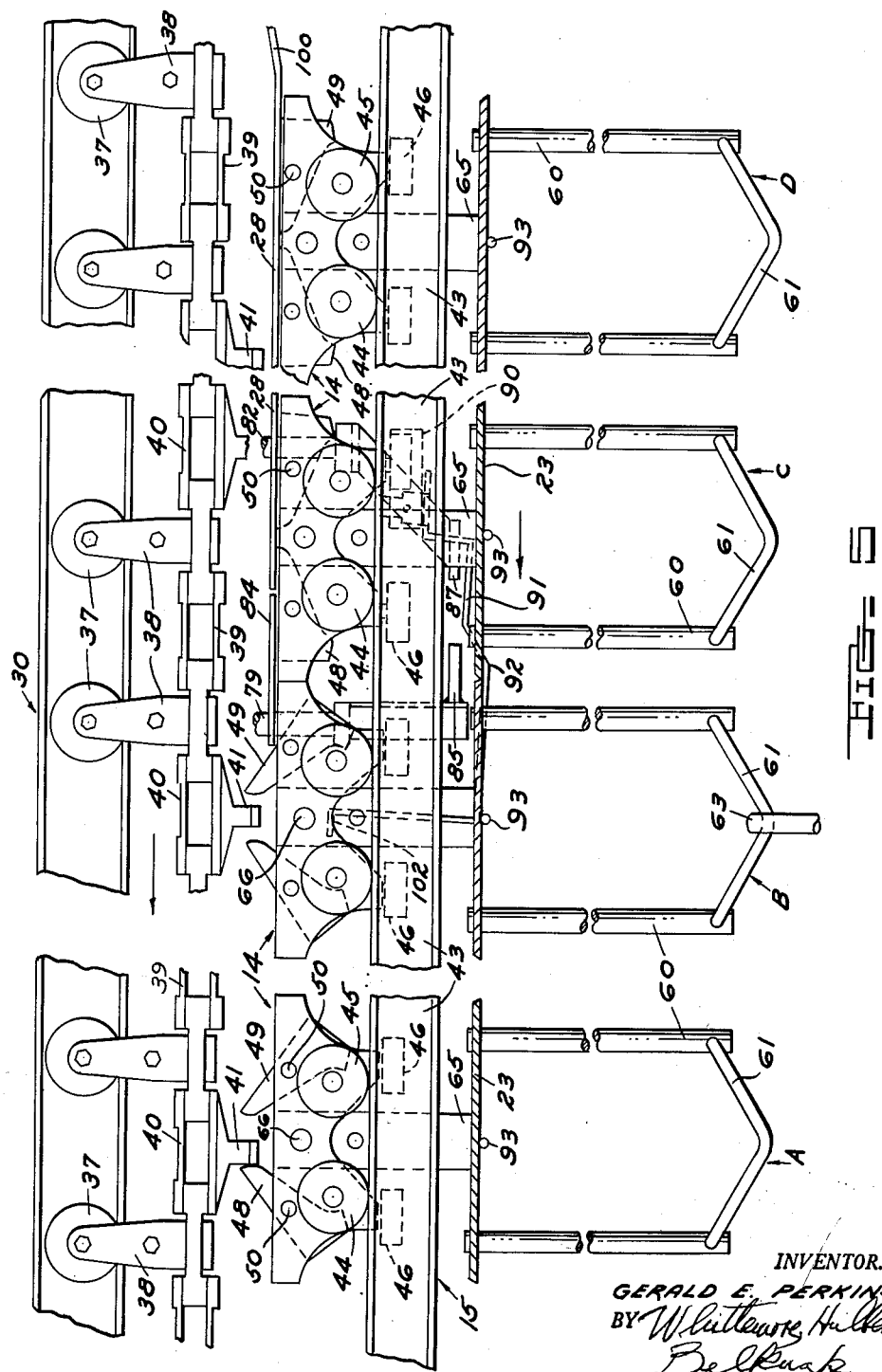

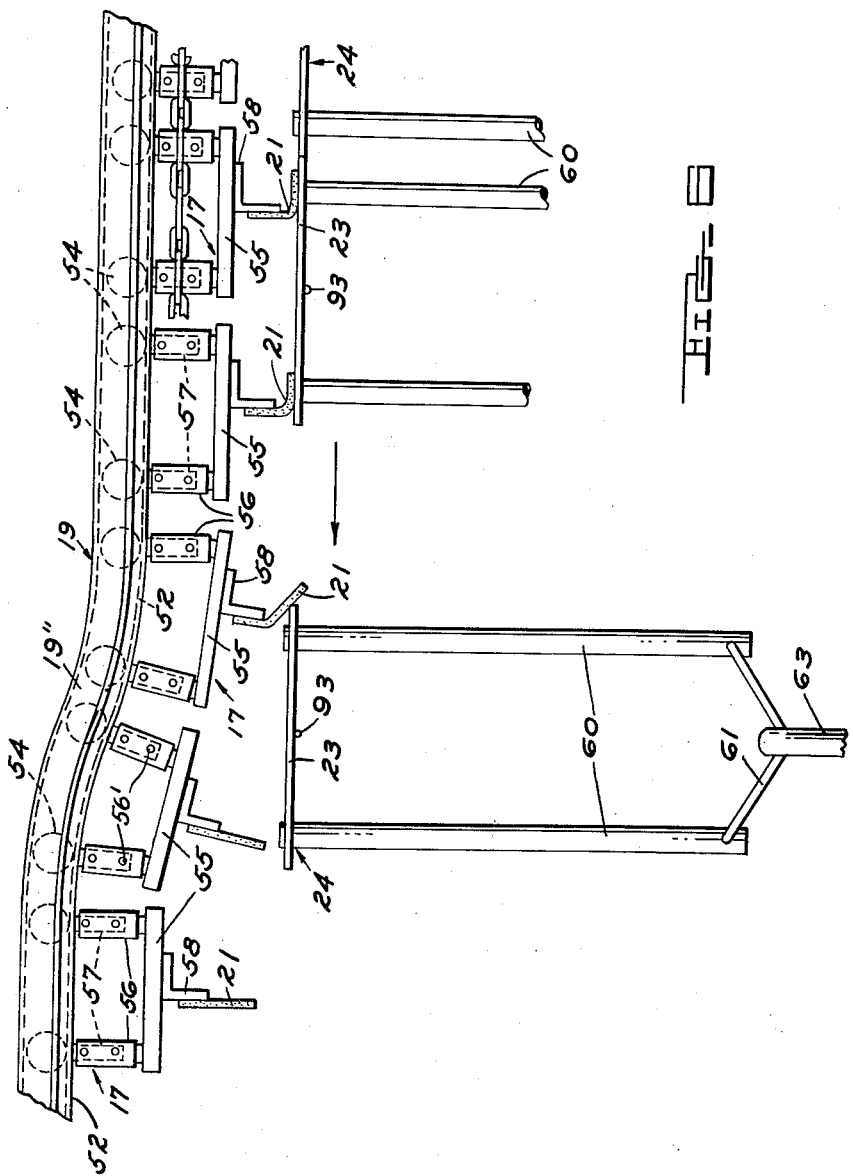

United States Patent Office 3,020,855
Patented Feb. 13, 1962

3,020,855
CONVEYOR STOP, RELEASE AND
ADVANCE MECHANISM
Gerald E. Perkins, Westfield, N.J., assignor to Mechanical Handling Systems, Inc., Detroit, Mich., a corporation of Michigan
Filed July 29, 1959, Ser. No. 830,378
8 Claims. (Cl. 104—250)

The present invention relates to improvements in a conveyor stop, release and advance mechanism of a type employing special article carriers, shown in an illustrative installation as being propelled in one phase of advance along an overhead track system by chain-driven dogs in positive driving engagement with trolleys from which the special carriers are suspended. More particularly, the improvements of the invention involve the automatic halting of such trolleys and suspended carriers in a series at an accumulation station on the trolley track in question, as by an appropriately timed escapement device, and, upon actuation of such device, to free the trolleys for further advance.

In accordance with the invention, there is provided a special type of auxiliary pusher conveyor which is effective, upon decoupling of the driven power conveyor dog from a carrier-suspending trolley, to urge the latter into an accumulation zone, and then depart from propelling engagement with a member of the carrier. In doing this a pusher member of the auxiliary pusher conveyor moves over and relative to a surface of the latter as it is halted at the accumulation zone.

In broad respects, the improvement in regard to the pusher conveyor resembles what is illustrated and described in my copending application, Serial No. 813,862, filed May 18, 1959, relating to a system for the pusher-propulsion of article carrying receptacles or like objects by conveyor means traveling beneath such objects.

It is an object of the invention to provide an automatic stop, release and advance mechanism for the conveyor system, herein shown as an overhead type installed in a factory or like building, in which flat-surfaced objects, such as article carriers suspended from a main overhead power trolley track, are conjointly controlled in arriving at, being halted at and departing from an escapement type stop and release station by coacting endless conveyor devices, one of which is in the form of a power chain carrying dogs having releasable driving engagement with trolleys on the main track from which the article carriers are suspended, and the other conveyor device being an endless one carrying longitudinally spaced pushers which are adapted to have impositive driving engagement with the article carriers to advance the same along the path of the last named conveyor device, in parallel or tangential relation to the main trolley track, so long as the travel of the article carrier is not predeterminedly impeded, and which depart from propelling engagement with the carriers when the latter are so impeded. In accordance with the illustrated embodiment of the invention, the pushers are flexible in character and have impositive propelling engagement with the carriers at the rear of the latter, these pushers yielding and sliding along a flat surface of the carriers when the travel of the latter is predeterminedly impeded, as by an escapement device at a stop and release station, mentioned above.

A more specific object is to provide a conveyor system featuring an accumulating mechanism on a track reach thereof (shown as a two-armed escapement device automatically controlled in its action by article carriers arriving at the stop and release station and by further article carriers to which a transfer of articles on the halted carriers may be desired), in which the article carriers have horizontal flat upper surfaces of substantial dimension, in the direction of advance of the carriers, along which surfaces the flexible pushers of a conveyor device traveling past the stop and release station have sliding engagement, once the article carrier is halted at the stop and release station, either directly by the escapement device or by engaging a forward article carrier or series of carriers so halted.

Yet another object is to provide a conveyor having an impositive pusher feature, as described in the previous paragraph, as combined with a main power conveyor normally propelling trolleys from which the article carriers are suspended, as by propelling engagement with an upwardly projecting dog on such trolley, and means for automatically decoupling the main conveyor from such dog-propelling engagement as the trolley is brought into the stop and release escapement zone, the pushers then taking over propelling engagement with the article carriers and sliding past the latter upon their halt.

The foregoing as well as other objects will become more apparent as this description proceeds, especially when considered in connection with the accompanying drawings illustrating the invention, wherein:

FIG. 3 is a somewhat schematic plan view, sectioned horizontally along a line corresponding to the broken line 3—3 of FIG. 4, illustrating the escapement device in relation to parallel power and pusher conveyor track provisions, and to article carriers controlled by the escapement device;

FIG. 4 is a view in vertical section along line 4—4 of FIG. 3;

FIG. 5 is a somewhat schematic view in vertical section along line 5—5 of FIG. 3; and FIG. 6 is a side elevational view, as from the line 6—6 of FIGS. 3 and 4, being also somewhat schematic in character.

The improvements of the invention are illustrated herein in association with an overhead type factory conveyor system, in which it is desired to propel article carriers suspended from overhead, track supported load trolleys along a path to enable objects supported by such article carriers to be automatically transferred to another carrier. As herein shown, the article carriers are of a depending hook type, and the transfer is effected by occasioning a change in the elevation of such carriers, at a transfer point, relative to the elevation of further article carriers on a conveyor to which the transfer is to be made; these article carriers also being of a hook type and traveling in a path of tangency to or parallelism with the first named carrier at the transfer point. However, the manner in which the transfer is accomplished constitutes no part of the present invention, and in fact nothing is herein shown or described relating to the conveyor to which the transfer is to be made; and it is to be understood that the invention is in no wise limited in this manner.

Figure 1:
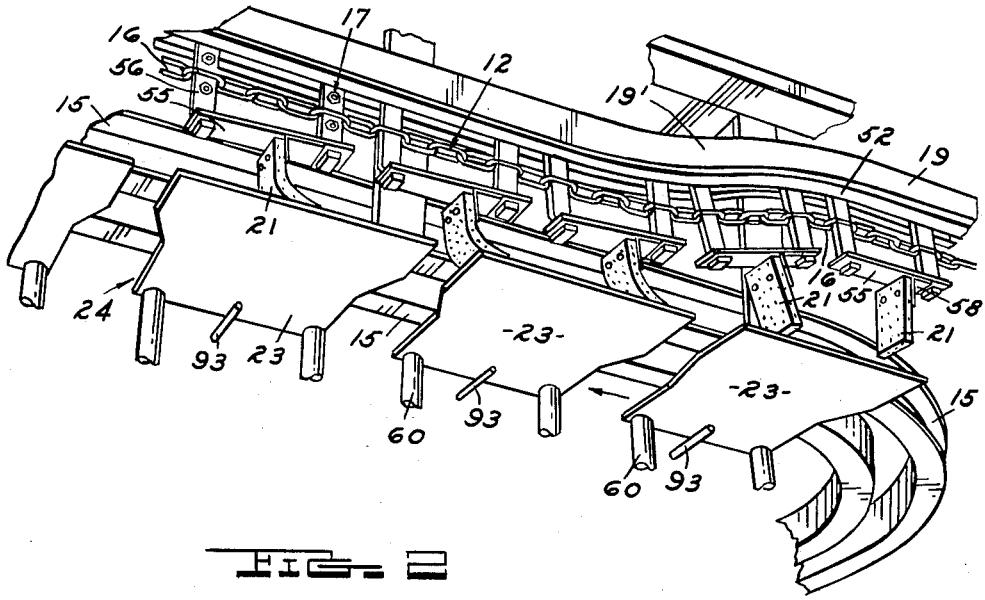
FIG. 1 is a fragmentary bottom perspective view illustrating a typical pusher conveyor installation in accordance with the invention.
Figure 2:
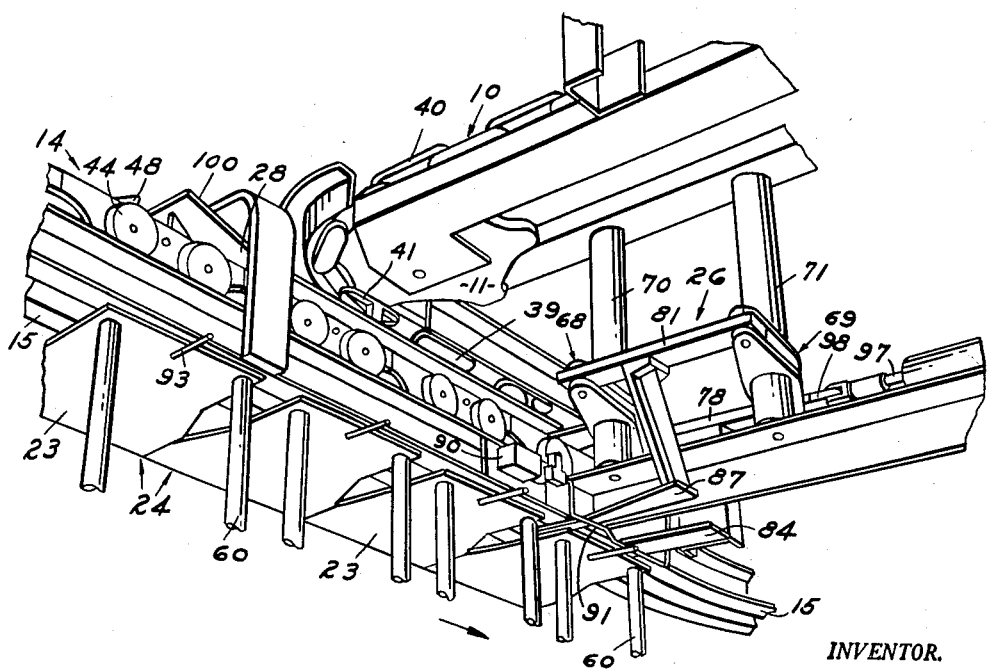
FIG. 2 is a further fragmentary bottom perspective view showing escapement-type trolley stop and release components for the control of trolleys traveling a track under impositive propelling engagement by pushers of the conveyor appearing in FIG. 1.

As generally illustrated in FIGS. 1 and 2, the conveyor system in accordance with the invention, is constituted by an endless overhead power chain 10 suitably guided by vertically journaled sprockets 11 or the like to travel in an orbital path; and a further endless auxiliary, chain-type conveyor 12. The conveyor 10 is suitably driven positively in an appropriate fashion, as in a conventional manner by caterpillar-type engagement with the links of a further driving chain (not shown); and it carries pusher dogs (to be described) which are adapted to have positive propelling engagement with load trolleys 14 traveling on the top flanges of a load track 15, also to be further described.

As shown in FIG. 1, the auxiliary conveyor 12 includes an endless chain 16 articulating pusher trolleys 17 which are sustained by rollers traveling between the flanges of a pusher conveyor track 19, which is located above the main trolley load track 15, and passes along one outer side of a longitudinal reach of the latter, as indicated in FIG. 4. Pusher trolleys 17 carry depending flexible pusher dogs 21 which, as the auxiliary conveyor track 19 inclines downwardly toward the plane of the reach of track 15 in question, then travels in parallel relation to the latter, are adapted to come into propelling engagement with flat plate members 23 of the article carriers, generally designated 24, yet to depart from such propelling engagement, flex and slide forwardly over the top flat surfaces of the plate members 23 when the forward travel of carriers 24 is predeterminedly impeded.

The carriers 24 are suspended from the powered trolleys 14 in a manner to be described for transport around the track 15 and into the zone of the escapement mechanism of the invention, generally designated 26 and to be hereinafter described in detail. In thus traveling the track 15 the trolleys 14 have free travel, but are engaged and impositively advanced by the pushers 21 in approaching the zone of the escapement mechanism 26. Since it is the function of the device 26 to effect a timed halting and release of the trolleys and article carriers 24 from this zone, for positive propulsion by the pusher dogs of powered chain 10 to a transfer point (not shown), it is necessary that provision be made to avoid the propelling engagement of trolleys 14 by the dogs of chain 10 while the trolleys are halted by the escapement mechanism or device 26 (the flexible auxiliary conveyor pushers 21 sliding over the carrier plates 23 in this phase), and therefore a fixed hold-down plate cam 28 is provided along the zone of action of the escapement device 26, for the purpose of depressing certain movable dogs of the trolleys 14, as they come into this zone, out of position to be engaged by powered conveyor 10.

As indicated above, escapement device 26 is controlled conjointly, in releasing trolleys for departure from the stop and release zone, by a switch associated with the device (in a manner hereinafter described further) and by a further suitable switch or trip device (not shown) whose function is simply to indicate the presence or absence of an article on an article carrier of a transferee conveyor (not shown), so as to avoid interference of articles on two loaded carriers at the intended transfer zone.

With the foregoing general description of the main components of a conveyor system, reference may now be had to FIGS. 3 through 6, in conjunction with FIGS. 1 and 2, for further operating details and relationships.

The conveyor trolley load track 15, a power trolley chain track 30 spaced directly thereabove, the auxiliary pusher conveyor track 19, the escapement mechanism or device 26, and any other fixedly mounted components of the system are appropriately supported on a conventional sort of superstructure, generally designated 31, made up of angle iron uprights 32, horizontal beams 33, plates 34, and the like, all installed in a manner perfectly apparent to those skilled in the art. Power trolley track 30 may take the form of a conventional sort of I-beam monorail 36 rollingly supporting rollers 37 journaled in depending arms 38 which are articulated in spaced links 39 of the chain 10; and between each of such articulating links 39 there is a chain link 40 carrying a trolley propelling dog 41, in an entirely conventional manner. Chain 10 is, as indicated above, driven positively in its endless travel in any appropriate fashion.

The main trolley load track 15 is shown as constituted by a pair of oppositely disposed, laterally spaced track members 43 of channel cross section; and the trolleys 14 have spaced forward and rearward rollers 44, 45 riding the upper flanges of these track members, with forward and rearward guide rollers 46 received within the webs of the track members 43 to guide trolleys 14 in the horizontal sense. Trolleys 14 are each provided with forward and rearward dogs 48, 49, respectively, pivoted thereon at 50, in a conventional manner, one of these dogs 48 being adapted to be engaged and propelled by the power conveyor chain dog 41 in a well known way.

Referring to FIG. 5 in conjunction with FIG. 2, the trolley dog hold-down plate cam 28 is fixedly mounted appropriately directly above the path of trolley advance (in the direction of the arrows in FIGS. 2 and 5); and at a proper elevation such that, in advancing beneath the plate 28, both of the trolley dogs 48, 49 are depressed sufficiently to take them out of the horizontal plane of travel of the upper dogs 41, thereby decoupling the trolleys from driving engagement by the power chain 10. They advance forwardly, as thus decoupled, under impositive propelling engagement by the pushers 21 of the auxiliary conveyor 12.

The auxiliary conveyor track 19 may be constituted of a box-like cross section, closed along its top and provided with a pair of inturned, laterally spaced bottom flanges 52. These receive and rollingly support pairs of forward and rearward anti-friction rollers 54 of the auxiliary conveyor pusher trolleys 17.

As best shown in FIGS. 4 and 6, the trolleys 17 may take the form of a rigid plate 55 having upright arms 56 suitably pivoted thereon adjacent its front and rear, as by pivot pins 56'; and the rollers 54 are journaled on upright stems 57 which are suitably secured to the arms 56.

Thus it is seen that the flexible coupling of the arms 56 at each end of the plate 55 and the provisions for adjustment just described permit flexible movement at the trolley connections in ascending or descending an incline without binding; and also the adjustable positioning of the flexible pusher members 21, in relation to the elevation of an article carrier propelled thereby. This enables the amount of propelling force exerted by the pusher member 21, prior to yielding out of position for propelling action, to be selected as desired.

The pusher members 21 may be constituted by a suitable length of any appropriate belt material, or an appropriate lamination of such materials to secure the desired degree of propelling action, coupled with desirous yieldability.

The connection of the pushers 21 to the rigid trolley plates 55 may be effected by angle iron pieces 58, to which the members 21 are suitably secured, as by bolting, riveting or the like.

The suspended article carriers 24, in addition to the flat upper plates 23 thereof, each comprise a pair of vertically elongated tubular arms 60 fixedly mounted at their upper ends at spaced points along an inner edge of the respective plates 23, i.e., along a longitudinal edge of the plate paralleling its direction of travel and on the side of the plate adjacent the escapement device 26 to which the auxiliary conveyor pusher members 21 impositively propel the article carriers 24. The lower ends of the tubular arms 60 of each carrier 24 are connected by a cross hanger piece 61 of mildly V-shaped outline, this piece, as shown in FIG. 4, being offset somewhat outwardly from the vertical plane of the arms 60. As indicated above, and as illustrated in FIG. 6, it is adapted to support an object being conveyed by the carrier 24, such as the hooked upper end 63 of a supplemental individual article support of one kind or another.

The article carrier 24, as constituted by the arms and cross piece 61, is suspended from the longitudinal side of a trolley 14 by means of a pair of laterally spaced, vertically elongated plates 65, preferably fixedly secured at 66 to the body of the trolley 14 adjacent the upper ends of the plates in question. The lower ends thereof may have a rigid connection to the top of the flat plate 23 of the carrier, although, if desired, provision may be made for a swiveling of the latter about a vertical axis relative to the plate at this point. The supporting plates 65, as illustrated in FIGS. 3 and 4 and as hereinafter described, are adapted to be engaged by components of the escapement device 26 at the stop and release station, thus to halt the advanced article carrier 24 under the coordinated control of a limit switch associated with the device 26 and a remote switch which signals the presence or absence of an article on an article carrier of another conveyor to which a transfer of an object 63 is to be made.

The escapement device or mechanism 26 comprises a tandem-arm, walking beam arrangement, comprising pairs of like rocker arms 68, 69, mounted for oscillation in a common horizontal plane adjacent and on the inner side of the main trolley load track 15, and transversely spaced from one another at 90° to the longitudinal center line of that track. For the purpose of mounting the arms 68, 69 for oscillating movement, the superstructure 31 has fixedly mounted thereon a pair of vertical bearing sleeves 70, 71, corresponding respectively in their intended spacing to that of the rocker arms 68, 69. The arms 68, 69 are, actually, constituted by pairs of like elongated plates 73, 74, mounted in vertically spaced and registered relation to one another by suitable elongated tubular spacers 75, against the tops and bottoms of which the plates 73, 74 are rigidly clamped. A vertical pivot rod 76 extends through each of the bearing sleeves 70, 71, and through the center point of the rocker arms 68, 69 constituted by plates 73, 74, to serve as pivotal axes for the oscillation of the arms.

A coupling bar 78 extends between and is pivotally connected to and beneath corresponding, forwardly disposed ends of the rocker arms 68, 69, as at the respective pivots 79, 80; and a similar coupling bar 81 is similarly connected at 82, 83 to the corresponding, rearwardly disposed ends of the arms 68, 69, as best shown in FIG. 3 of the drawings.

The escapement device 26 further comprises a forward escapement finger 85 which is rigidly secured, as by a depending bracket 86, to the forward coupling bar 78, extending parallel to the latter and transversely of the vertical center line of the main trolley load track 15. Finger 85 is at an elevation slightly above the tops of the plates 23 of carrier 24, and has a pointed nose which, with the tandem rocker arm arrangement in its solid line position of FIG. 3, is positioned across the line of travel of the suspending plates 65 of an article carrier 24, thus to halt that carrier (with its trolley dogs 48, 49 depressed by holddown cam 28 in the manner shown in FIG. 4) against further advance by the dogs 41 of conveyor power chain 10, as well as advance by the pusher members 21 of auxiliary pusher conveyor 12, the pusher members 21 simply sliding frictionally forward over the top surface of the article carrier plate 23. Bracket 86 also supports, for transverse movement at the elevation of the fixed trolley dog hold-down cam or plate 28, a movable hold-down plate 84, the function of which will be later described.

A second or rear escapement finger 87 is fixedly mounted, as by a forwardly offset, depending bracket member 88, on the rear escapement coupling bar 81, so as to travel transversely of the center line of the trolley load track 15 in a vertical plane spaced rearwardly from the plane of action of the forward escapement finger 85, as illustrated in FIG. 3. Thus, when the forward finger 85 is in its solid line position of that figure, it engages the suspending plates 65 of the forwardmost article carrier 24 to halt the latter, while the connected and movable hold-down plate 84 depresses the dogs 48, 49 of the trolley 14 suspending that carrier. When finger 85 is retracted, the second or rear escapement finger 87 is advanced from its solid to its dotted line position, in which it is adapted to be engaged by the suspending plates 65 of the next article carrier 24 to the rear of the forward carrier, the latter being released upon retraction of the forward finger 85.

It will be apparent that, with a forwardmost article carrier halted by escapement finger 85 at the stop and release station of device 26, with its trolley dogs 48, 49 depressed by movable dog hold-down plate 84, succeeding carriers 24 will be accumulated behind the halted foremost carrier with their dogs held down by fixed cam plate 28, such carriers being pushed into place behind the halted carrier by the conveyor pusher members 21, which then flex as illustrated in FIG. 6 to slide over the top plate 23 of the carrier without advancing the latter. As illustrated in FIG. 1, the auxiliary conveyor trolley track 19 may be provided with a downward incline at 19' to bring the pusher members 21 into a suitable elevation for propelling engagement with the carriers, as in approaching the stop and release station, and/or to ride upwardly, as at 19", out of position for engagement with the carriers (FIG. 6), as on retreating from the station along the linear direction of the track 19.

The reference numeral 90 (FIGS. 2 and 5) generally designates a suitable limit switch adapted to be tripped by article carriers 24 advancing into the position at which they are halted by the forward escapement finger 85. To this end, the limit switch 90 (otherwise of entirely conventional nature) is provided with an elongated, rod-like trip arm 91 extending forwardly from its connection to the switch 90 in the direction of travel of the carriers. As illustrated in FIG. 5, arm 91 has an inclined downward offset at 92 which is adapted to be engaged by tripping tappets 93 fixed on and projecting inwardly from the carrier plates 23, in position to so engage and actuate the trip rod 91.

For the purpose of oscillating the arms 68, 69 of escapement device 26, and thus projecting and retracting the respective escapement fingers 85, 87 in alternation, a suitable pneumatic cylinder and plunger type motor 95 is appropriately mounted to a superstructure upright 32, as by a swivel connection 96, the plunger 97 of the motor 95 being pivotally connected by a clevis 98 to one of the coupling bars 78, 81 of the tandem arm rocker unit of escapement device 26. The motor 95 may be a single or double acting one, its actuation controlled in part by an electrical circuit in which the limit switch 90 is wired in a manner which will be apparent to those skilled in the art. As will also be evident, such circuit, in accordance with the intended application of the principle of the invention, will include another limit switch (not shown) responsive to the presence or absence of a conveyed object of an article carrier (not shown) of a further conveyor to which it may be desired to transfer the object 63, as by causing a relative vertical movement of such article carriers at a tangent or parallel zone of travel of the conveyors last referred to. As indicated above, provisions for these purposes, including provisions for the controlled operation of the escapement device 26, constitute no part of the present invention and may, indeed, be of a wide variety, in accordance with the requirements of the intended installation.

In operation, and reference being had to FIG. 5 of the drawings, in which a succession of article carriers handled by the mechanism of the invention are specially designated A, B, C and D, it is seen that these carriers, in approaching the stop and release station under propulsion by the pushers 21 of the auxiliary conveyors 12, have their trolley dogs 48, 49 depressed out of the plane of travel of the power conveyor dogs 41 upon encountering the mildly inclined rear ramp portion 100 of the holddown cam plate 28. The foremost article carrier 24 (designated "A") has been released by the forward escapement finger 85 and is in a position (to which it may have advanced to some extent by frictional propulsion by a pusher member 21) in which the forward dog 48 of its trolley 14, as released upon retraction of movable hold-down plate 84, may be engaged and propelled by a dog 41 of the main power chain 10. It is driven under such propulsion toward a transfer zone or other disposal point, the trolley 14 riding the top of the main conveyor load track 15.

As shown in FIG. 5, the carrier "B" to the rear thereof has just been released by the escapement finger 85, its trolley dogs 48, 49 have been released by the hold-down cam plate 84 and now counterbalanced upward to position for propelling engagement of the dog 48 by the chain dog 41, and the tappet arm or finger 93 on the carrier plate 23 is ready to ride off the forward end of switch operating rod 91. Meanwhile, the second or rear escapement finger 87 has, upon retraction of the forward finger 85, been projected into the path of travel of the carrier hanger ("C") plates 65, so that the third carrier "C" is halted; and the fourth article carrier, designated "D," as well as still further carriers behind the same, may be accumulated under the action of the flexible pushers of auxiliary conveyor 12 in propelling engagement behind the rear of such carrier or carriers.

As the released carrier "B" rides off the end of the limit switch rod 91, the latter drops down (being restrained in this movement by the engagement with a suitable fixed piece—not shown—of an offset stop portion 102 on the forward end of the rod, as shown in FIG. 5), and the resultant electrical circuit at limit switch 90 occasions a return stroke of the air cylinder motor 95, as the result of which the rear escapement finger 87 is moved out of the path of the hanger plates 65 of article carrier "C," freeing the latter for advance, until it is impeded by the now-projected forward escapement finger 85, to which it is propelled by a flexible pusher member 21, raising limit switch rod 91 again in so moving. It is released from restraining by escapement finger 85 upon receipt of a coordinating signal, in the manenr described above.

The invention provides an improved dual conveyor system and control device by which, under alternate escapement action, article carriers of a special, flat-surfaced type, may be accumulated for access as desired at a stop and release station. At this station, a main power conveyor chain operates continuously to carry propelling dogs for driving engagement with a halted article carrier, once the same is released for advance by the escapement device. As halter, a dog on a trolley from which the article carrier is suspended is automatically taken out of position for propelling engagement by the main chain; and an auxiliary conveyor maintains the supply of article carriers at the accumulation station, advancing the same toward and into the latter, then passing in frictional sliding engagement over the flat surface of the article carrier. Switch provisions are made for the automatic control of the escapement device, although it will be appreciated by those skilled in the art that there are various procedures in which corresponding action may be controlled, if desired, and that, in fact, such control may be manually governed, if circumstances permit.

The structure is rugged and simple in nature, is capable of custom, factory built installation, and is very versatile as to the applications to which it can be put, as determined by the requirements of the installation in question.

What I claim as my invention is:

1. In a conveyor system of the type characterized by a load track supporting trolleys or like units for travel therealong under propelling engagement by a driven conveyor, the improvement for the retardation and release of flat-surfaced article carriers adapted to be carried by said units for travel therewith, comprising a conveyor having means guiding the same for movement in a path adjacent and along at least a portion of said first named track at a predetermined zone of the latter, said last named conveyor having pusher elements positioned thereon for propelling engagement with said article carriers in advancing the latter along said zone, means for interrupting propelling engagement of said first named conveyor with said units in said zone as said units and article carriers are propelled by said pusher elements, and means adjacent said zone to impede travel of said article carriers at said zone, said pusher elements being constructed to move out of propelling engagement with said carriers when the travel thereof is impeded and to pass along the flat surface thereof.

2. In a conveyor system of the type characterized by a load track supporting trolleys or like units for travel therealong under propelling engagement by a driven conveyor, the improvement for the retardation and release of flat-surfaced article carriers adapted to be suspended from and carried by said units for travel therewith, comprising a conveyor having means guiding the same for movement in a path adjacent, above and along at least a portion of said first named track at a predetermined zone of the latter, said last named conveyor having pusher elements depending therefrom for propelling engagement with said article carriers in advancing the latter along said zone, means for interrupting propelling engagement of said first named conveyor with said units in said zone as said units and article carriers are propelled by said pusher elements, and means adjacent said zone to impede travel of said article carriers at said zone, said pusher elements being constructed to move out of propelling engagement with said carriers when the travel thereof is impeded and to pass along the flat surface thereof.

3. In a conveyor system of the type characterized by a load track supporting trolleys or like units for travel therealong under propelling engagement by a driven conveyor, the improvement for the retardation and release of flat-surfaced article carriers adapted to be carried by said units for travel therewith, comprising a conveyor having means guiding the same for movement in a path adjacent and along at least a portion of said first named track at a predetermined zone of the latter, said last named conveyor having pusher elements positioned thereon for propelling engagement with said article carriers in advancing the latter along said zone, means for interrupting propelling engagement of said first named conveyor with said units in said zone as said units and article carriers are propelled by said pusher elements, and means adjacent said zone to impede travel of said article carriers at said zone, said pusher elements being constructed to flex out of propelling engagement with said carirers when the travel thereof is impeded and to pass frictionally along the flat surface thereof.

4. In a conveyor system of the type characterized by a load track supporting trolleys or like units for travel therealong under propelling engagement by a driven conveyor, the improvement for the stop and release of flat-surfaced article carriers adapted to be suspended from and carried by said units for travel therewith, comprising a conveyor having means guiding the same for movement in a path adjacent, above and along at least a portion of said first named track at a predetermined zone of the latter, said last named conveyor having pusher elements depending therefrom for propelling engagement with said article carriers in advancing the latter along said zone, means for interrupting propelling engagement of said first named conveyor with said units in said zone as said units and article carriers are propelled by said pusher elements, and an escapement device mounted for operation adjacent said zone to periodically engage and impede travel of said article carriers at said zone, said pusher elements being constructed to flex out of propelling engagement with said carriers when the travel thereof is impeded and to pass frictionally along the flat surface thereof.

5. In a conveyor system of the type characterized by a load track supporting trolleys or like units for travel therealong under propelling engagement by a driven conveyor, the improvement for the stop and release of flat-surfaced article carriers adapted to be suspended from and carried by said units for travel therewith, comprising a conveyor having means guiding the same for movement in a path adjacent, above and along at least a portion of said first named track at a predetermined zone of the latter, said last named conveyor having pusher elements depending therefrom for propelling engagement with said article carriers in advancing the latter along said zone, means for interrupting propelling engagement of said first named conveyor with said units in said zone as said units and article carriers are propelled by said pusher elements, and an escapement device mounted for operation adjacent said zone to periodically engage and impede travel of said article carriers at said zone, said pusher elements being constructed to flex out of propelling engagement with said carriers when the travel thereof is impeded and to pass frictionally along the flat surface thereof, said escapement device including means operated at least in part by said article carriers to cause movement of the escapement device into and out of position in which it so impedes travel of said article carriers.

6. A conveyor system comprising load supporting units having means supporting the same for travel along a predetermined horizontal path, each unit comprising a flat-surfaced article carrier, and an endless conveyor having means guiding the same for movement adjacent the path of travel of said units, said conveyor having flexible pusher elements articulated thereto for propelling engagement with said article carriers in advancing the latter along said path, said pusher elements being of flexible non-metallic friction material adapted to flex when the travel of its carrier is interrupted and to slide along the flat surface of the carrier without propelling the latter, said conveyor having individual articulated trolleys, one for each pusher element, to which trolley the element is fixedly secured and from which it projects transversely, the trolley having forward and rearward guide rollers, and a longitudinal track along which said trolley rollers travel and by which said trolleys and pusher elements are maintained in said engagement with the carriers.

7. A conveyor system comprising an endless conveyor and load supporting units having means supporting the same for travel along a predetermined horizontal path, each unit comprising a flat-surfaced article carrier having means engaging said conveyor from beneath for travel therewith, said conveyor having means guiding the same for movement adjacent the path of travel of said carriers and above a predetermined zone along said path, flexible pusher elements depending from and articulated to said conveyor for propelling engagement with said article carriers in advancing the latter along said zone, said pusher elements being of flexible non-metallic friction material adapted to flex when the travel of its carrier is interrupted and to slide along the flat surface of the carrier without propelling the latter, said conveyor having individual articulated trolleys, one for each pusher element, to which trolley the element is fixedly secured and from which it projects transversely, the trolley having forward and rearward guide rollers, and a longitudinal track along which said trolley rollers travel and by which said trolleys and pusher elements are maintained in said engagement with the carriers.

8. A conveyor system comprising continuously driven conveyor and load supporting units having means supporting the same for travel along a predetermined horizontal path, each unit comprising flat-surfaced article carriers having means engaging said conveyor from beneath for travel therewith, said conveyor having means guiding the same for movement adjacent the path of travel of said carriers and above a predetermined zone along said path, flexible pusher elements depending from and articulated to said conveyor for propelling engagement behind the flat surfaces of said article carriers in advancing the latter along said zone, and means for interrupting propelling engagement of said conveyor with said units as said units and article carriers are propelled by said pusher elements along said zone, said pusher elements being of flexible non-metallic friction material adapted to flex when the travel of its carrier is interrupted and to slide along the flat surface of the carrier without propelling the latter, said conveyor having individual articulated trolleys, one for each pusher element, to which trolley the element is fixedly secured and from which it projects transversely, the trolley having forward and rearward guide rollers, and a longitudinal track along which said trolley rollers travel and by which said trolleys and pusher elements are maintained in said engagement with the carriers.

References Cited in the file of this patent

UNITED STATES PATENTS

| 2,572,011 | Cohen et al. | Oct. 23, 1951 |
| 2,619,916 | Rainier | Dec. 2, 1952 |
| 2,885,969 | Kay | May 12, 1959 |